United States Patent [19]
Campo et al.

[11] Patent Number: 5,334,821
[45] Date of Patent: Aug. 2, 1994

[54] PORTABLE POINT OF SALE TERMFINAL

[75] Inventors: James A. Campo, Brunswick; Fred J. Anderson, Wooster; Donald M. Embree, Uniontown; Charles J. Hofstetter, Aurora; Donald I. Sloan, Stow, all of Ohio

[73] Assignee: Telxon Corporation, Akron, Ohio

[21] Appl. No.: 915,470

[22] Filed: Jul. 16, 1992

[51] Int. Cl.⁵ ............................................. G06K 5/00
[52] U.S. Cl. .................................. 235/380; 235/375; 235/381
[58] Field of Search .................. 235/375, 381, 380

[56] References Cited
U.S. PATENT DOCUMENTS 4,947,028 8/1990 Gorog .................................. 235/381
5,189,287 2/1993 Parienti .............................. 235/375

*Primary Examiner*—Harold Ritts
*Attorney, Agent, or Firm*—Pretty, Schroeder, Brueggemann & Clark

[57] ABSTRACT

A point of sale terminal is disclosed that provides all of the usual point of sale terminal functions, but that is entirely field portable. Data pertinent to each purchase can be input to the terminal via a keyboard assembly, a touch-screen display or a signature-capture screen assembly, or via an antenna and radio link from an associated bar code scanner. Data may be communicated at any time to a remote host computer, also via a separate antenna and radio link. The communication links with the host computer and the bar code scanner operate independently and simultaneously, using mutually compatible modulation schemes such as a spread spectrum scheme for the host computer link and a narrowband or spread spectrum scheme for the bar code scanner link. The terminal thereby functions as a portable repeater or node in a data communications network.

10 Claims, 3 Drawing Sheets

PORTABLE POINT OF SALE TERMINAL

BACKGROUND OF THE INVENTION

This invention relates generally to point of sale terminals and, more particularly, to point of sale terminals adapted for portable use.

Point of sale terminals are commonly used in retail stores to record information relating to sales transactions. In its most basic form, the terminal includes a keyboard for the manual entry of data and a printer for printing a paper tape receipt for delivery to the customer. Many point of sale terminals are now associated with bar code scanners for reading the bar codes printed on the items being purchased. Most commonly, the bar code scanners take the form of fixed laser scanners built into a counter top at the point of sale. Other bar code scanners include portable wands and handheld scanners having scanning lasers or charge-coupled device detectors for scanning the bar codes.

Conventional point of sale terminals also commonly include magnetic readers for reading the data recorded on the customers' credit cards. The customers' credit is then verified by electronically accessing an appropriate database over a telephone line.

Although the point of sale terminals described generally above have proven to be extremely effective in facilitating sales transactions, they have not proven to be entirely satisfactory in all applications. Because the terminals are essentially immobile, they are not adapted for use in situations where merchandise is sold at remote locations, away from a retail store environment, or at movable locations within such a retail store environment. It should therefore be appreciated that there is a need for a point of sale terminal that provides the usual point of sale terminal functions, but that is portable. The present invention fulfills this need.

SUMMARY OF THE INVENTION

This invention is embodied in a point of sale terminal that provides the usual point of sale functions, but that is sized and configured to allow it to be moved conveniently to any desired location, from which it can communicate over the air with a remote host computer. The terminal includes a hand-carryable housing having a front face, and a keyboard and a display are mounted on that front face. A power source is located within the housing, and first and second electromagnetic transceivers also are located within the housing, for transmitting and receiving data over the air to and from the host computer and a remote input/output device, respectively. The first transceiver can transmit and receive data modulated on a first carrier, in a spread spectrum format, while the second transceiver can transmit and receive data modulated on a second carrier, in a narrow band format located in a null of the power spectrum of the modulated first carrier. In this fashion, the two transceivers can transmit and receive data simultaneously without interference.

In another feature of the invention, the point of sale terminal includes a plurality of keyboards, each sized to be removably received individually in a recess formed in the housing's front face. Each keyboard can be selectively installed or removed from the recess only if the power source, which includes one or more removable batteries, is removed from the housing.

In another feature of the invention, a printer is located within the housing, for printing information on a strip of paper and discharging the printed paper from the housing, and a signature-capture screen is mounted on the front face of the housing, immediately adjacent to the paper path, for use in sensing the manual entry of information, such as signature. Conveniently, the printer discharges the paper directly across the top of the signature-capture screen, whereby the point of sale customer may sign his name on the paper while the screen automatically generates data representing that signature.

Other features and advantages should become apparent from the following description of the preferred embodiment, taken in conjunction with the accompanying drawings, which illustrate, by way of example, the principles of the invention.

DESCRIPTION OF THE PREFERRED EMBODIMENT

Figure 1:
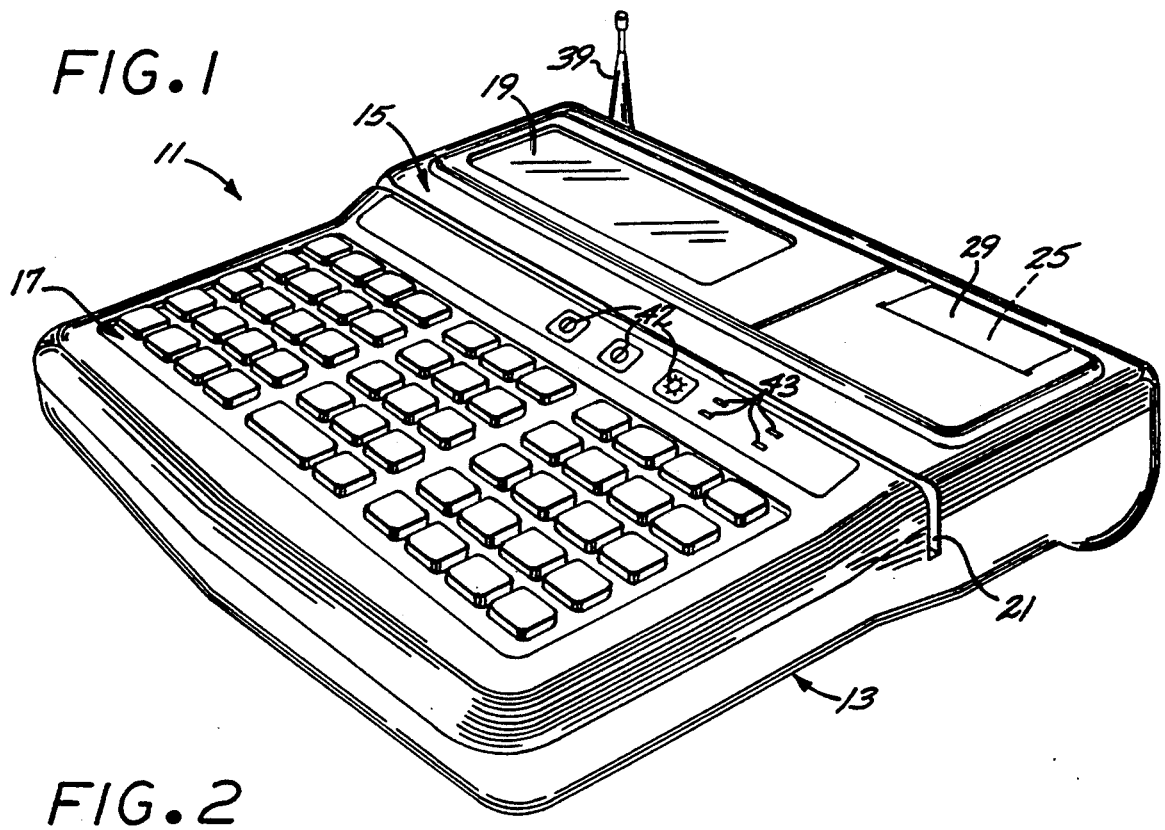
FIG. 1 is a front perspective view of a portable point of sale terminal in accordance with a preferred embodiment of the invention.
Figure 2:
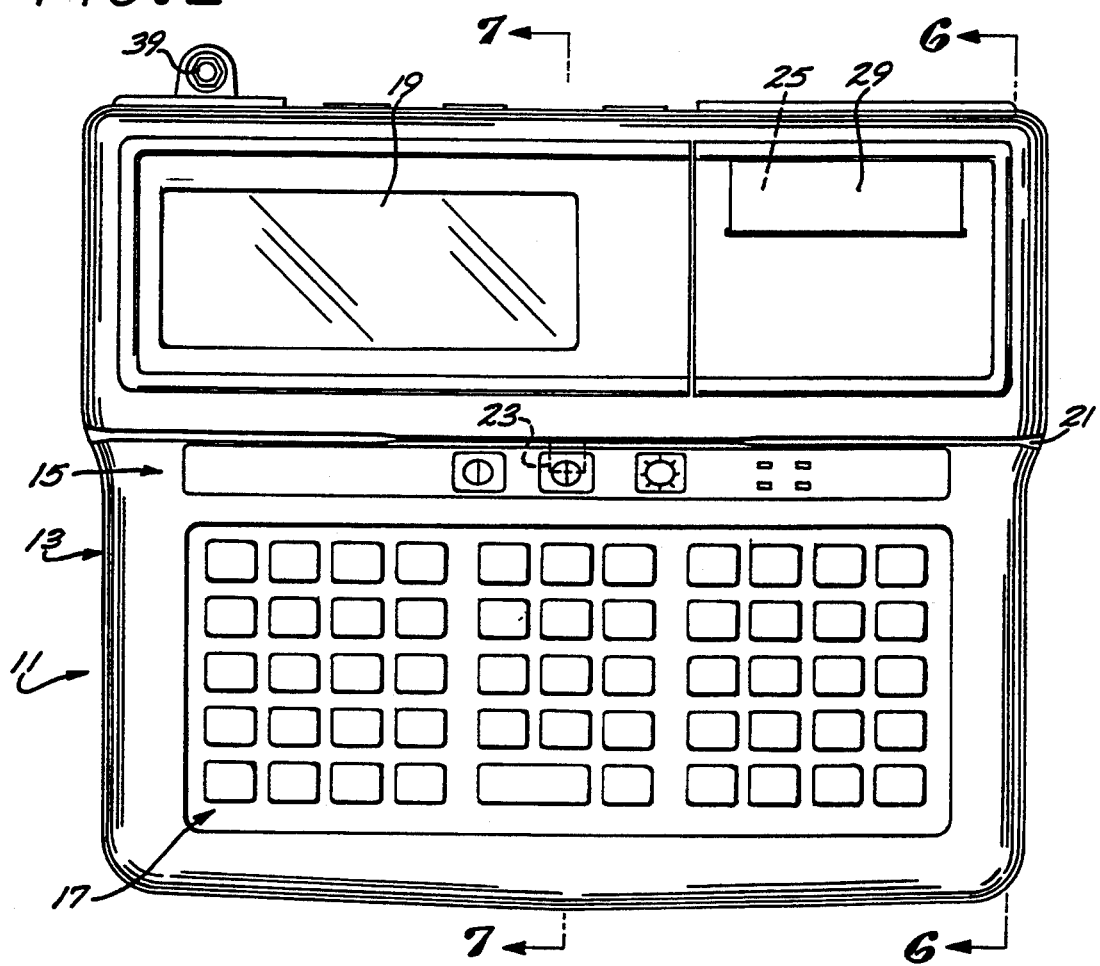
FIG. 2 is a plan view of the front face of the point of sale terminal of FIG. 1.
Figure 3:
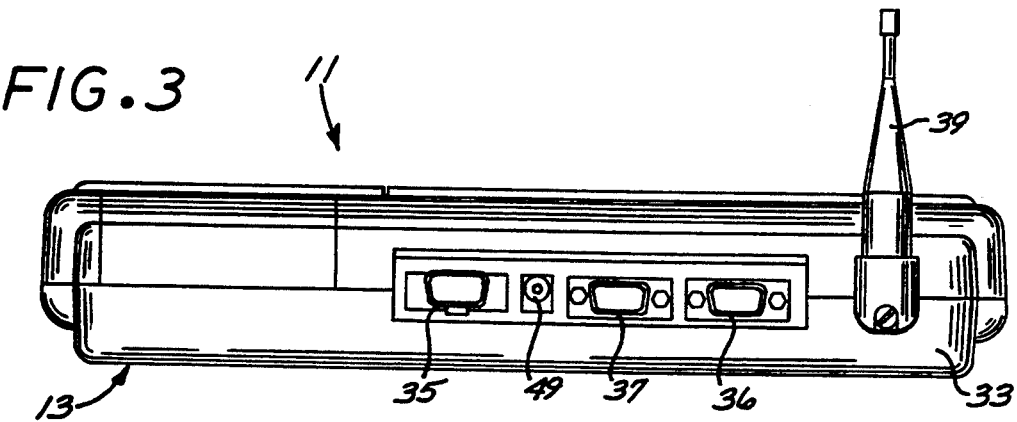
FIG. 3 is a rear elevational view of the point of sale terminal of FIG. 1.

With reference now to the drawings, and particularly to FIGS. 1 and 2, there is shown a point of sale terminal 11 that performs the normal functions associated with a retail sales transaction, yet is entirely field portable. The terminal includes a plastic housing 13 having a generally flat front face 15 on which is located a keyboard assembly 17, a multi-line liquid-crystal display (LCD) with touch panel 19, a transverse slot 21 and magnetic card reader 23 for receiving and reading data from a plastic credit card, and a screen assembly 25 adapted to digitally capture a purchaser's signature or any other information manually entered onto the screen by a stylus or writing pen (not shown). The LCD 19 can be selectively used to provide a display of selected information that prompts the operator to select from various options. A printer 27 located within the housing prints on a strip of paper 29 received from a paper roll 31 (FIG. 6) and discharges the printed paper across the signature-capture screen assembly 25 on the housing's front face 15.

The point of sale terminal 11 has a size generally comparable to that of a standard notebook. It thereby can be conveniently carried by the operator to any selected site where a sales transaction might occur, either within a retail store environment or at a remote location. Via radio data links, the terminal functions as a portable repeater or node in a data communications network.

Several input/output connectors are located in an upper side wall 33 of the housing 13, adjacent to the upper edge of the front face 15. One such connector 35 is adapted to receive a multi-wire cable connected to a remote bar code scanner or wand (not shown), for use in scanning bar codes printed on the products being sold, in a conventional fashion. Another connector 36 is adapted to receive a multi-wire cable connected to a host computer (not shown) with which the point of sale terminal 11 operates. Yet another connector 37 may be used to receive a multi-wire cable connected to a peripheral device (not shown) such as an external printer, an external display, a modem, or a laser slot scanner.

An antenna 39 projects upwardly from the upper side wall 33, for use in transmitting data to and from the remote host computer. The antenna and an associated radio module 41 located within the housing 13 provide a convenient alternative for the connector 36 and its associated cable. In some applications, this connector can be eliminated altogether.

An additional antenna is located on a printed circuit board (not shown) carried within the housing 13, for use in transmitting data to and from the remote bar code scanner. This provides a convenient alternative for the connector 35 and its associated cable.

Figure 8:
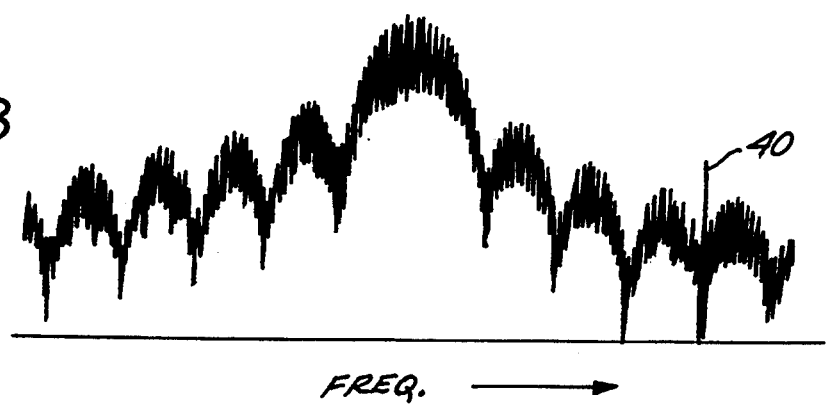
FIG. 8 is a plot of the power spectral densities of two rf data links used by the point of sale terminal of FIG. 1.
Figure 4:
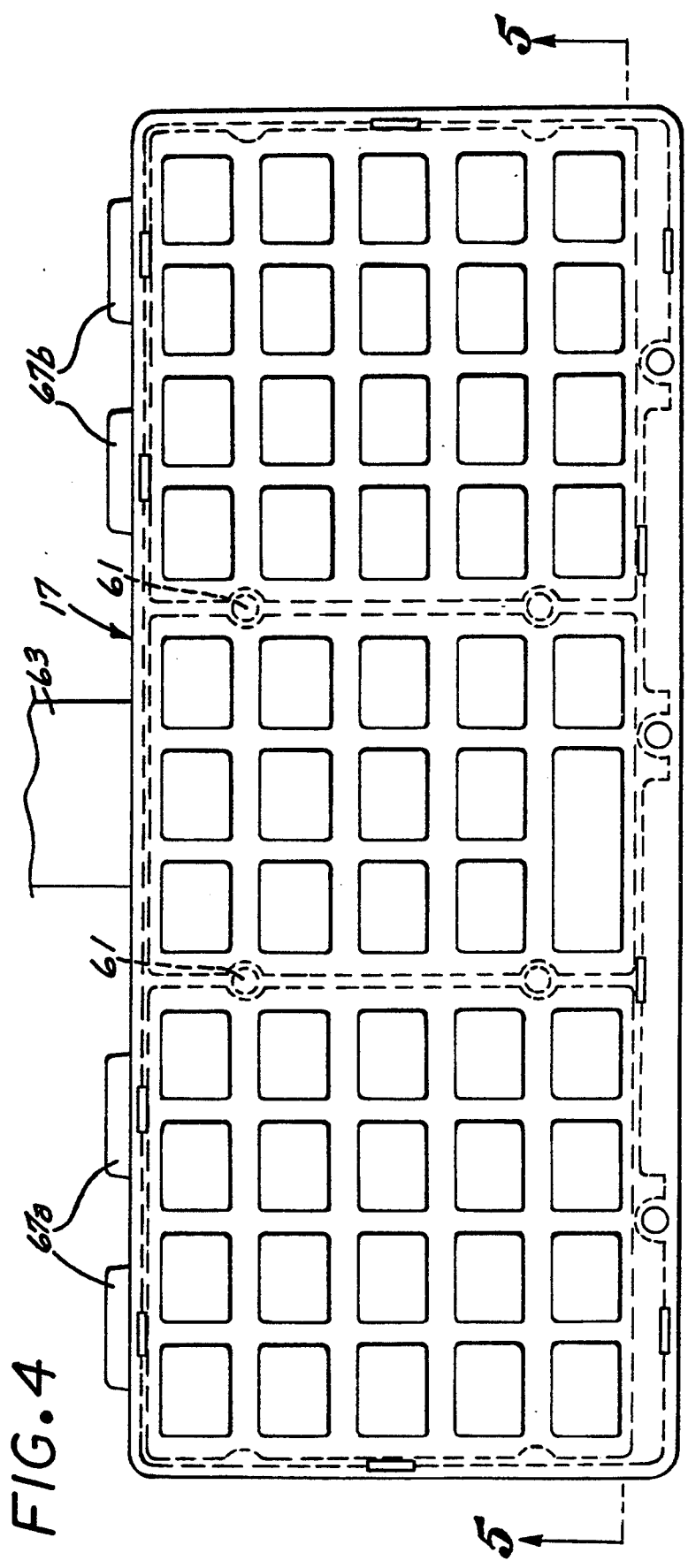
FIG. 4 is a plan view of the keyboard assembly portion of the point of sale terminal of FIG. 1.

The point of sale terminal 11 preferably is configured such that it can communicate with the remote bar code scanner and the host computer independently and simultaneously. This is accomplished by configuring the radio module 41 to use separate, compatible modulation schemes for the two data links. Preferably, communication occurs between the terminal and the host computer via a spread spectrum modulation scheme, while communication occurs between the terminal and the bar code scanner via a narrowband modulation scheme in which the carrier frequency 40 is selected to be aligned with a null in the frequency spectrum of the spread spectrum signal for the other data link. This is depicted in FIG. 8. The power level of the spread spectrum link can be as much as two orders of magnitude greater than that of the narrowband link, without excessive interference.

In an alternative to the two modulation schemes represented in FIG. 8, both data links can modulate the data in a spread spectrum format. In this case, interference between the two modulation signals is avoided by using different carrier frequencies and different pseudo-random code sequences in effecting the modulation. In yet another alternative, both data links can use narrowband modulation, over different frequency channels.

With reference again to FIG. 1, the front face 15 of the terminal 11 further includes three membrane switches 42, for use in switching the terminal on and off, controlling the contrast of the LCD 19, and controlling a backlight for the LCD. The front face also includes LED indicators 43, for indicating terminal conditions such as charge, external power, low battery, and status.

The various electrical components of the terminal 11, including the LCD 19, the printer 27, the signature-capture screen assembly 25, and the radio module 41, are powered by a battery pack 44 located in a recess 45 accessible via a pivotable door 47 on the underside of housing 13. The battery pack preferably includes batteries that are rechargeable, and the terminal further includes a conventional charging circuit (not shown) and a charger jack 49 located in the housing's upper side wall 33.

It is recognized that many users will have special point of sale applications calling for different keyboard functions, layouts and key sizes. Rather than seek to accommodate all of those users with just a single keyboard assembly, the point of sale terminal 11 of the invention utilizes a plurality of keyboard assemblies, each having its own function, layout and key size. One such keyboard assembly 17 is depicted in the drawings.

As shown in FIGS. 4-7, the keyboard assembly 17 is received in a shallow recess 51 formed in the flat front face 15 of the housing 13. The keyboard assembly includes a planar support base 53 for providing rigidity, a membrane switch assembly 55 secured by an adhesive to the support base, an elastomeric keypad 57 overlying the switch assembly, and a plastic bezel 59 overlying the keypad. Actually, the keypad depicted in the drawings includes three side-by-side sections, including a left section 57a with 20 function keys, a middle section 57b with a set of standard numeric keys, and a right section 57c with 20 function keys, similar to the first section 57a. This modularity enables portions of the keypad to be changed at a lower cost than a single, large keypad.

Figure 5:
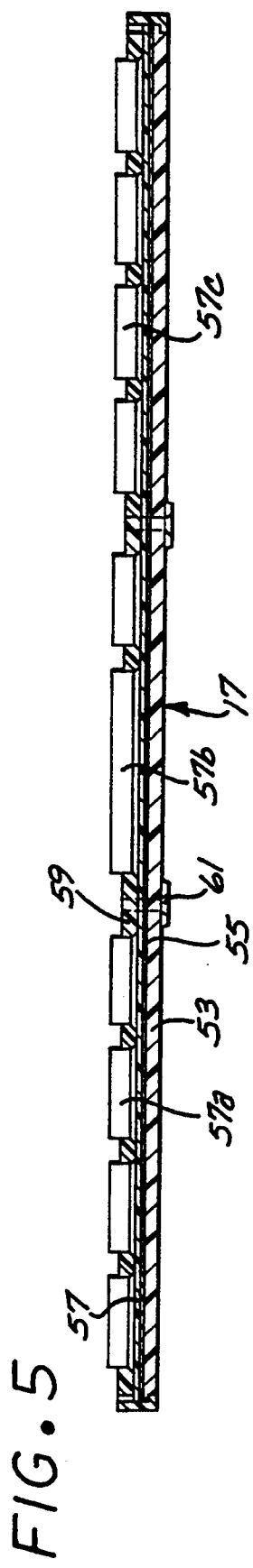
FIG. 5 is a sectional view of the keyboard assembly, taken substantially in the direction of the arrows 5—5 in FIG. 4.

The bezel 59 snaps into the support base 53, as best shown in FIG. 5. The entire assembly 17 is then held together as a unit using four screws 61, thereby providing the requisite rigidity to withstand shock impacts commonly experienced by portable equipment.

The bezel 59 includes horizontal and vertical crossbars that define a plurality of apertures aligned with the individual keys of the keypad 57. Manually depressing any selected key brings together two spaced-apart contacts in the membrane switch assembly, to close a predetermined circuit. A ribbon connector 63 connects the membrane switch assembly with associated electronic circuitry carried on a printed circuit board 65 located within the housing 13.

The keyboard assembly 17 is installed in the front face 15 of the housing 13 by inserting two tabs 67a and 67b projecting outwardly from the bezel 59 into mating apertures formed in the housing. The assembly then rests on a ledge 69 that defines the keyboard recess 51, and it is secured in place by three screws 71, which are accessible via the battery recess 45. The screws engage threaded bores formed in the underside of the support base 53. Unthreading the screws enables the keyboard assembly to be pivoted upwardly out the recess, for removal from the terminal 11.

This mode of securing the keyboard assembly 17 to the housing 13 ensures that the screws 71 for securing the keyboard assembly are accessible only if the batteries are first removed from the battery recess 45. This prevents removal of the keyboard assembly while the terminal 11 is powered, whereby inadvertent electrical hazards due to exposed electrical components are minimized.

The provision for readily interchangeable keyboard assemblies 17 allows the terminal 11 to use keyboard technologies other than elastomeric keyboards without requiring an expensive redesign of the terminal. Such other technologies include resistive touch panels, membrane matrices, full-travel QWERTY, capacitive panels, and electromagnetic panels.

To guard against the radiation of unwanted electromagnetic interference (EMI), the housing 13 and the underside of the keyboard assembly's support base 53 are plated with a metallic shield. The top side of the membrane switch 55 and mounting bosses on the underside of the bezel 59 also are plated with a metallic shield. The plated shield on the membrane switch also provides a low impedance path for ESD discharges. Radiating keyboard logic signals thereby are completely surrounded by shielding, protected from ESD, while significantly reducing EMI emissions.

As previously mentioned, and with reference again to FIG. 1, the printer 27 discharges a paper tape 29 along a path directly over the signature-capture screen assembly 25. The paper is held flat against the screen assembly by portions of the housing's front face that overlie the paper's two side edges. This configuration allows the purchaser to sign his or her name directly onto the paper strip while the screen simultaneously senses the writing of that signature and generates corresponding digital data. The screen assembly is a conventional device that generates a series of 10-bit words representing the writing of information on it.

Positioning the paper strip 29 on top of the signature-capture screen assembly 25 provides two important benefits. First, the purchaser can be provided a written receipt for the purchase, and second, the interposition of the paper between the pen and the screen spreads out the pressure provided by the pen and thereby minimizes potential damage to the screen.

Figure 6:
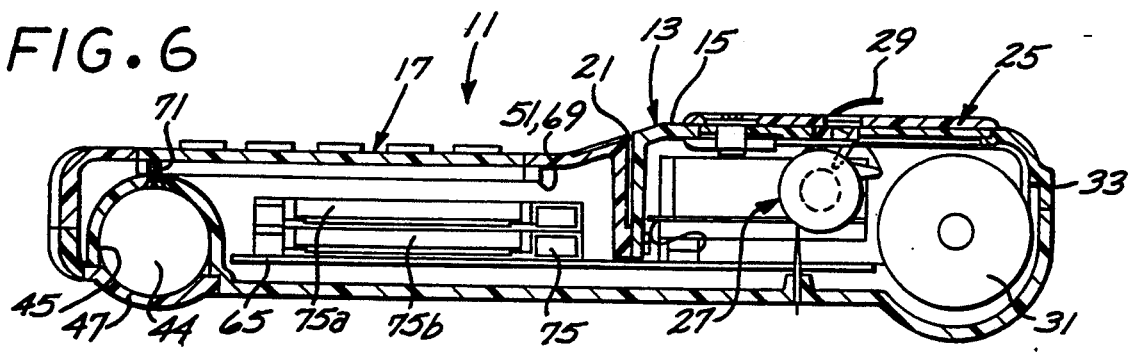
FIG. 6 is a sectional view of the point of-sale terminal, taken substantially in the direction of the arrows 6—6 in FIG. 2.
Figure 7:
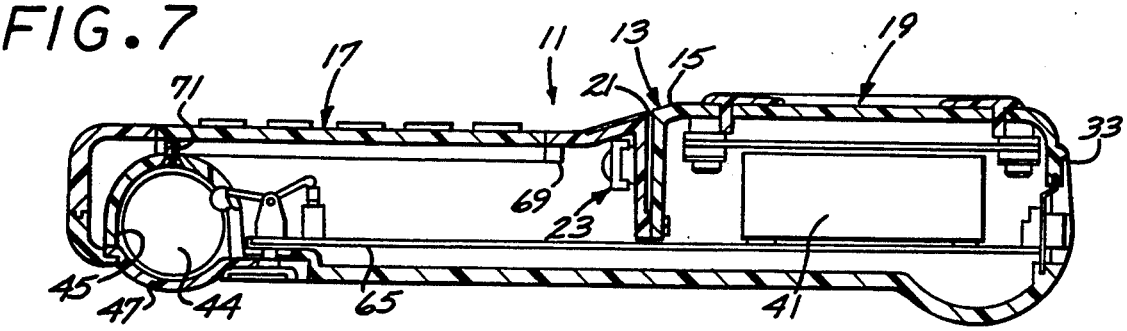
FIG. 7 is a sectional view of the point of sale terminal, taken substantially in the direction of the arrows 7—7 in FIG. 2.

With reference now to FIG. 6, there are shown two slots and for receiving printed circuit boards 75a and 75b that carry non-volatile flash ROM or RAM memory circuits. A spring-biased eject lever 75 secures the boards in place when they are installed. The memories carried on these boards can be used to store data associated with the successive purchases, thus constituting an electronic journal that is the functional equivalent of the successive paper tape receipts. After a given period of time, e.g., one work shift, the memory boards can be removed and the stored data transferred to a host computer for further processing. This is an alternative or backup for the more real-time transmission of such data via the radio module 41 and antenna 39 or via the connector 36 and associated cable.

It should be appreciated from the foregoing description that the present invention provides an improved point of sale terminal that provides all of the usual point of sale terminal functions, but that is entirely field portable. Data pertinent to each purchase can be input to the terminal via a keyboard assembly, a touch-screen display, or a signature-capture screen assembly, or via an antenna and radio link from an associated bar code scanner. Data may be communicated at any time to a remote host computer, also via the antenna and radio link. The communication links with the host computer and the bar code scanner operate independently and simultaneously, using mutually compatible modulation schemes such as a spread spectrum scheme for the host computer link and a narrowband or spread spectrum scheme for the bar code scanner link.

Although the invention has been described in detail with reference only to the preferred embodiment, those of ordinary skill in art will appreciate that various modifications can be made without departing from the invention. Accordingly, the invention is defined with reference only to the following claims.

We claim:

1. A portable point of sale terminal comprising:
a hand-carryable housing having a front face;
a keyboard and a display mounted on the front face of the housing;
a power source located within the housing;
a first electromagnetic transceiver located within the housing for transmitting and receiving data over the air to and from a host computer; and
a second electromagnetic transceiver located within the housing, for transmitting and receiving data over the air to and from a remote input-output device.

2. A portable point of sale terminal as defined in claim 1, wherein:
the first electromagnetic transceiver transmits and receives data modulated on a first carrier, in a spread spectrum format; and
the second electromagnetic transceiver transmits and receives data modulated on a second carrier, in a narrowband format located at the frequency of a null of the power spectrum of the modulated first carrier.

3. A portable point of sale terminal as defined in claim 1, wherein the first and second electromagnetic transceivers operate simultaneously, each transmitting and receiving data over electromagnetic frequencies that do not interfere with the other.

4. A portable point of sale terminal as defined in claim 3, wherein one or both of the first and second electromagnetic transceivers transmit and receive data in a spread spectrum format.

5. A portable point of sale terminal as defined in claim 1, wherein:
the housing includes a recess in its front face; and
the point of sale terminal further includes a plurality of keyboards, each keyboard being sized to be removably received individually in the recess of the housing.

6. A portable point of sale terminal as defined in claim 5, wherein:
the power source includes one or more removable batteries; and
each of the plurality of keyboards can be mounted in the recess of the housing, and removed from the recess of the housing, only if the one or more batteries are removed from the housing.

7. A portable point of sale terminal as defined in claim 1, and further including:
a printer located within the housing, for printing information on a strip of paper and discharging the paper from the housing; and
a screen mounted on the front face of the housing, for sensing the manual writing of information thereon and generating corresponding data.

8. A portable point of sale terminal as defined in claim 7, wherein the printer is located adjacent to the screen and is arranged such that the discharged paper overlays the screen.

9. A portable point of sale terminal as defined in claim 1, wherein the display is adapted to sense the manual selection of information by an operator of the terminal.

10. A portable point of sale terminal as defined in claim 1, and further including:
means defining a slot in the front face of the housing, the slot being sized to receive one edge of a credit card; and
magnetic reader means located within the housing for reading data recorded in a magnet strip of a credit card being slid along the slot.

* * * * *